US009052243B2

United States Patent
Suissa

(10) Patent No.: US 9,052,243 B2
(45) Date of Patent: Jun. 9, 2015

(54) DETECTION OF ACTIVE-MATERIAL OVERHEAT CONDITIONS WITHOUT TEMPERATURE SENSOR

(71) Applicant: GM GLOBAL TECHNOLOGY OPERATIONS LLC, Detroit, MI (US)

(72) Inventor: Avshalom Suissa, Kiryat Ono (IL)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 229 days.

(21) Appl. No.: 13/895,461

(22) Filed: May 16, 2013

(65) Prior Publication Data

US 2014/0340802 A1 Nov. 20, 2014

(51) Int. Cl.
*G01K 5/52* (2006.01)
*H02H 5/04* (2006.01)

(52) U.S. Cl.
CPC . *G01K 5/52* (2013.01); *H02H 5/042* (2013.01)

(58) Field of Classification Search
CPC ................................. H02H 5/042; G01K 5/52
USPC ........................................................ 361/103
See application file for complete search history.

(56) References Cited

U.S. PATENT DOCUMENTS

2010/0295654 A1* 11/2010 Pinto et al. ..................... 337/298
2012/0223727 A1* 9/2012 Gao et al. ....................... 324/691

\* cited by examiner

*Primary Examiner* — Thienvu Tran
*Assistant Examiner* — Kevin J Comber
(74) *Attorney, Agent, or Firm* — Mickki D. Murray; Parks Wood LLC

(57) ABSTRACT

A system, for use in protecting an active-material actuator from overheating without using a temperature sensor. The system includes an active material being transformable between a first state and a second state in response to a pre-determined stimulus, and being pre-tensioned to at least a pre-determined threshold, yielding the pre-tensioned active material. The system also includes a processing unit configured to perform operations comprising obtaining a value for electrical resistance of the pre-tensioned active material, estimating, based on the electrical resistance obtained, an strain value for the active material, yielding an estimated strain value, and obtaining an actual strain value for the active material. The operations also include determining a difference between the estimated strain value estimated and the actual strain value and determining, based on the difference determined, whether an overheating condition exists for the active material.

20 Claims, 4 Drawing Sheets

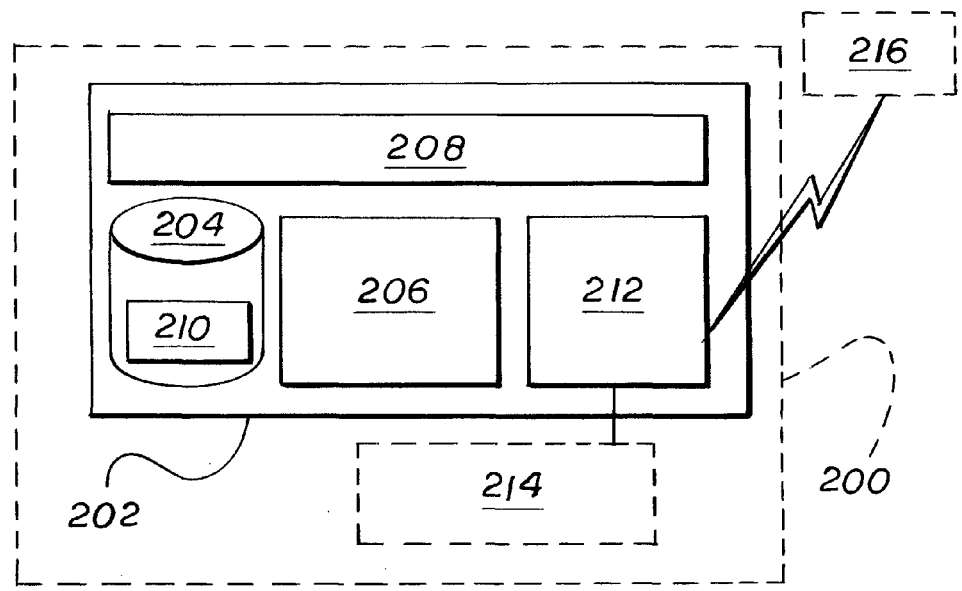
Fig_2
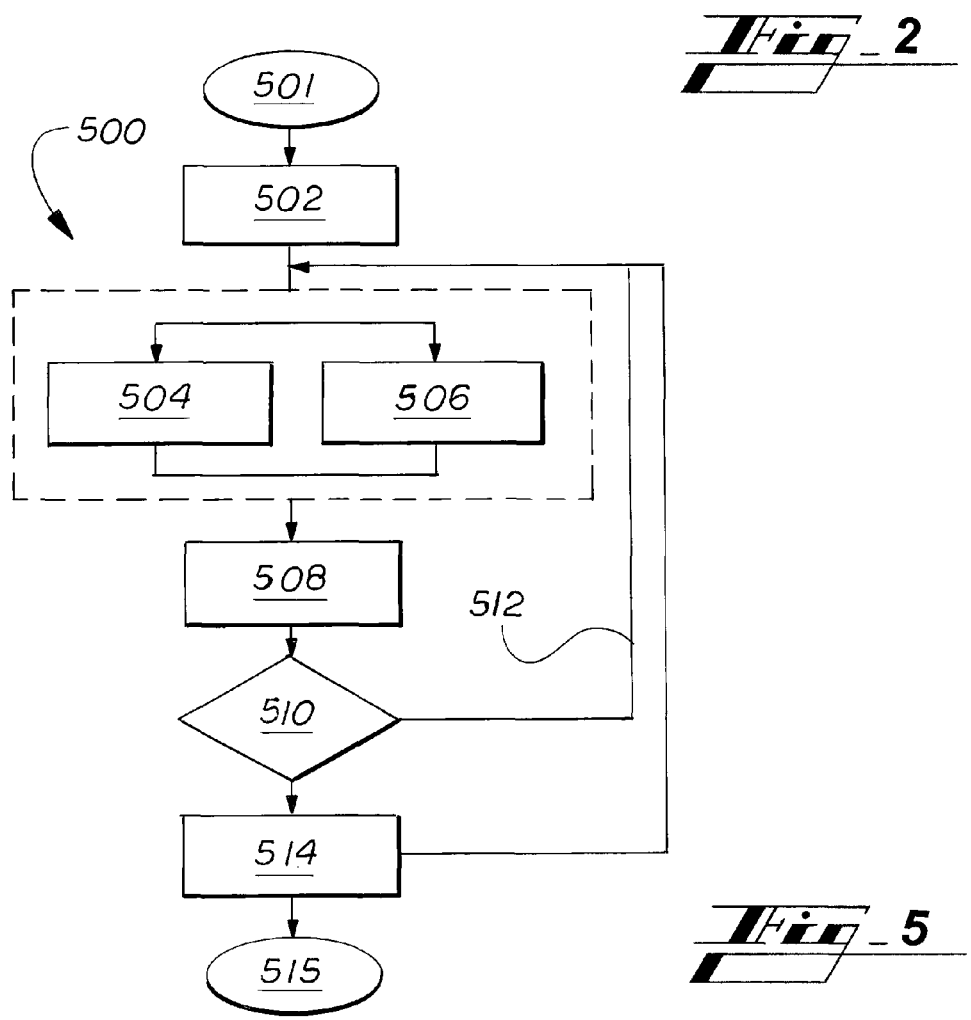
Fig_5

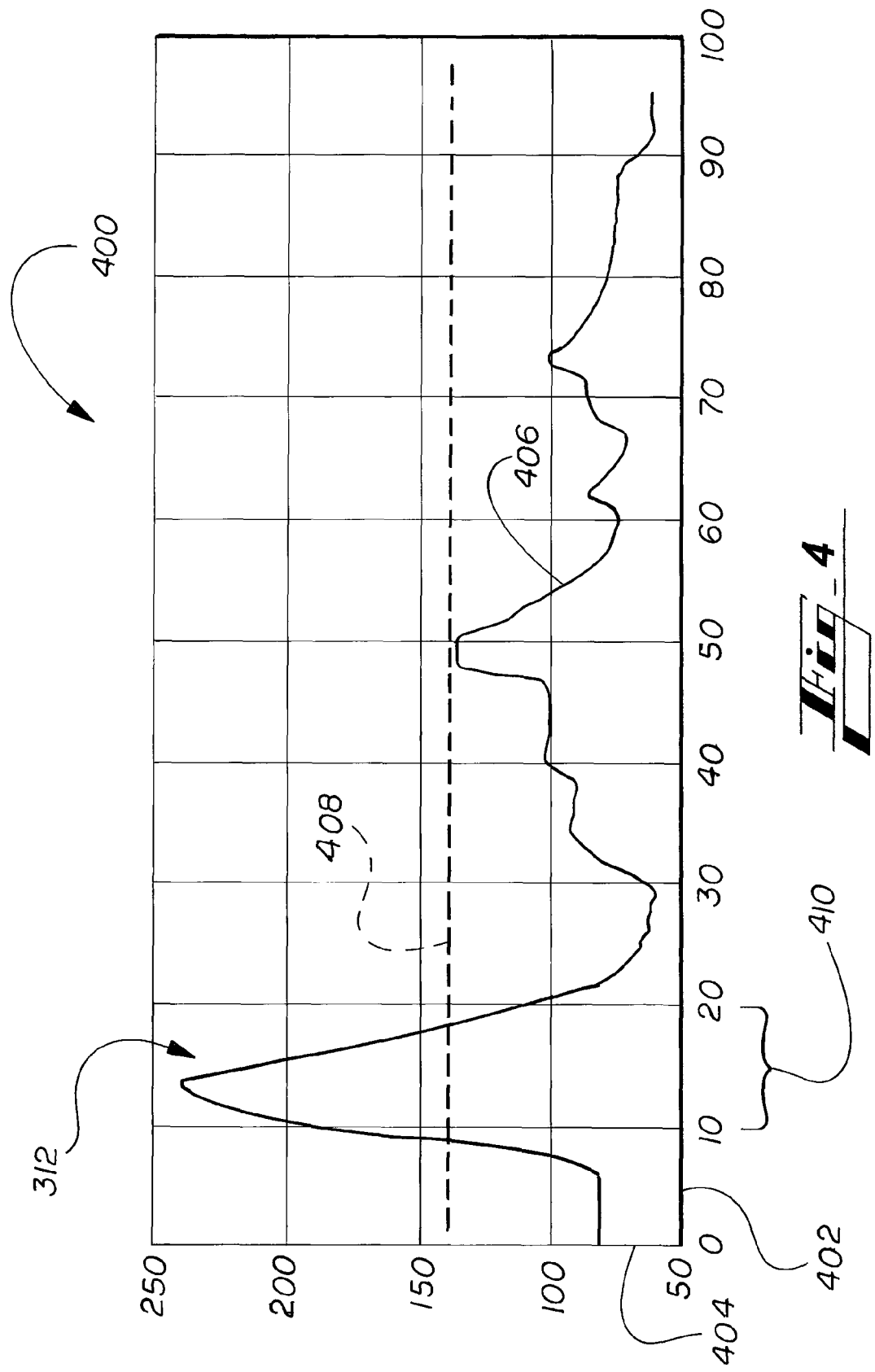

DETECTION OF ACTIVE-MATERIAL OVERHEAT CONDITIONS WITHOUT TEMPERATURE SENSOR

TECHNICAL FIELD

The present disclosure relates generally to detecting overheat conditions in an active, or smart, material used in an actuation device, and, more particularly, to systems and methods for detecting the conditions for active materials, such as shape-memory alloys (SMAs), without using a temperature sensor.

BACKGROUND

Active, or smart, materials are being used increasingly in a variety of industries. Active materials can provide benefits in cost savings over optional apparatus for performing like functions, space, or packaging, savings, and savings of resources such as computer-processing or other system-control resources. The materials can also be referred to as transformable materials because they transform, or change state, when exposed to a specific stimulus, as described further below.

In some cases, active materials allow longer system life, faster performance, smoother actuation, increased reliability, and/or more-accurate performance of the sub-system in which the material is used as compared to optional apparatus.

Active materials are being used in industries including transportation, such as in automotive, aerospace, and marine vehicles. Uses are not limited to transport vehicles, though. Active materials can be used in most any system requiring selective actuation of one or more mechanical components.

An active material can be described also as phase-change material because it performs work by changing its phase in response to being exposed to a specific stimulus, such as heat, electric current, lack of heat (e.g., cold), and radiation.

A popular active material is a shape memory alloy, or SMA. Other exemplary active materials include electroactive polymers (EAPs), piezoelectric materials, magnetostrictive materials, and electrorestrictive materials.

Shape-memory alloy is the generic name given to alloys that exhibit the relatively unusual property of having a strain memory, which can be induced by an input, e.g., a mechanical or thermal input. This unusual property is characterized primarily by two thermo-mechanical responses known as the Shape-Memory Effect (SME) and Superelasticity.

Exemplary alloys include copper alloys (CuAlZn), nickel-titanium-based alloys, such as near-equiatomic NiTi, known as Nitinol, and ternary alloys such as NiTiCu and NiTiNb. A particular exemplary allow includes NiTi-based SMAs. NiTi-based SMAs one or the best, if not the best memory properties—i.e., readily returnable to a default shape, of all the known polycrystalline SMAs. The NiTi family of alloys can withstand large stresses and can recover strains near 8% for low cycle use or up to about 2.5% for high cycle use. The strain recovery capability can enable the design of SMA-actuation devices in apparatuses requiring the selective transfer of torque from a torque generating device to each of a plurality of output shafts.

In an Austenite, or parent phase of an SMA, the SMA is stable at temperatures above a characteristic temperature referred to as the Austenite finish ($A_f$) temperature. At temperatures below a Martensite finish ($M_f$) temperature, the SMA exists in a lower-modulus phase known as Martensite. The unusual thermo-mechanical response of SMAs is attributed to reversible, solid-state, thermo-elastic transformations between the Austenite and Martensite phases.

Whichever type of active material used, it would be beneficial to determine accurately whether an overheat condition exists at the active material (e.g., SMA wire). Early detection can be used as a trigger to limiting input to the active material, to shutting off input to the active material, providing countering stimulus (e.g., cold), or taking other damage-preventing actions.

One way to determine whether an SMA temperature has surpassed a preferred range is to measure directly a temperature of the SMA or SMA environment—e.g., the environment to which the SMA is exposed. The sensor can send the temperature to a computer which determines whether the SMA is overheating.

Another way to determine whether the SMA temperature has surpassed the preferred range is to position a temperature-sensitive switch on or adjacent the wire. The switch could be, for instance, a thermistor, thermocouple, or resistance temperature detector.

Using such sensors has drawbacks including an increase in required space, or packaging, an increase in system cost, an increase in required resources such as computer-processing, slower system performance, and a possible decrease in system robustness or reliability. As can be seen, many of these shortcomings counter corresponding benefits, mentioned above, of using active materials in the first place.

There is a need for systems and methods configured to accurately determine whether an overheat condition exists for an active material, e.g., SMA wire, during operation of an actuator including the material, and especially for doing so without using a temperature sensor.

SUMMARY

The present technology relates in one aspect to a system, for use in protecting an active-material actuator from overheating without using a temperature sensor. The system includes an active material being (a) transformable between a first state and a second state in response to a pre-determined stimulus and (b) pre-tensioned to at least a pre-determined threshold, yielding the pre-tensioned active material.

The system also includes a processing unit configured to perform operations comprising obtaining a value for electrical resistance of the pre-tensioned active material, estimating, based on the electrical resistance obtained, an strain value for the active material, yielding an estimated strain value, and obtaining an actual strain value for the active material. The operations also include determining a difference between the estimated strain value estimated and the actual strain value and determining, based on the difference determined, whether an overheating condition exists for the active material.

In one embodiment, the operation of determining whether the overheat condition exists includes comprise comparing the difference determined to a pre-set strain threshold.

In another embodiment, the strain threshold is a percentage, and the operation of determining the difference includes determining a percentage difference between the estimated strain value and the actual strain value.

In one embodiment, the strain threshold is a strain value, and the operation of determining the difference includes determining the difference in value between the estimated strain value and the actual strain value.

In one embodiment, the operations further comprise initiating, in response to determining that the difference determined is equal to or exceeds the pre-set strain threshold, an active-material damage-prevention action.

And in one embodiment, the damage-prevention action includes removing or reducing an amount of a stimulus to the active material.

In one embodiment, the stimulus is selected from a group consisting of electrical current and heat.

In one embodiment, the operations further comprise repeating, in response to determining that the difference determined is not equal to and does not exceed the pre-set strain threshold in connection with a first time instance, the obtaining, estimating, obtaining, determining, and determining operations and comparing operations in connection with a second time instance to determine whether a difference between the actual and estimated strain values exceed the pre-set strain threshold in connection with a second time instance.

In another embodiment, the estimated strain is determined according to a function, as follows:

$$\epsilon_{pre} = aR + b;$$

$\epsilon_{pre}$ represents the strain being estimated;
R represents the resistance of the active material; and
a and b are pre-set constants.

In one embodiment, obtaining the value for electrical resistance includes receiving, from an electric meter, a signal indicating the value.

In one embodiment, obtaining the value for electrical resistance includes receiving, from an electric meter, data indicating a voltage and a current and determining the value for resistance therefrom.

In one embodiment, controlling the stimulus provided to the active material so that the material is kept within a pre-determined temperature range.

In one embodiment, the pre-determined temperature range is above an Austenite-finish-phase temperature associated with the active material and/or below a Martensite-finish-phase temperature associated with the active material.

And in one embodiment, the system further comprises an electric meter, in electrical communication with the active material, for use in obtaining the value for electrical resistance, and the processing unit comprises a processor and a computer-readable medium holding computer-executable instructions that, when executed by the processor, cause the processor to perform the operations.

In one embodiment, the pre-tension threshold is about 100 megapascals (MPa).

And in one embodiment, the active material includes a shape memory alloy.

In another embodiment, the active material is implemented as a wire.

In one embodiment, the system further comprises an actuator, wherein the active material is a part of the actuator.

In another aspect, the present disclosure relates to a method, for use in protecting an active-material actuator from overheating without using a temperature sensor, including a plurality of functions. The functions include, receiving, by a tangible processing unit, a signal from an electrical meter indicating, directly or indirectly, an electrical resistance of an active material connected to the meter, wherein the active material is (a) transformable between a first state and a second state in response to a pre-determined stimulus, and (b) pre-tensioned to at least a pre-determined threshold, yielding the pre-tensioned active material. The functions also include estimating, by the tangible processing unit, based on the electrical resistance, an strain value for the active material, yielding an estimated strain value, obtaining, by the tangible processing unit, an actual strain value for the active material, determining, by the tangible processing unit a difference between the estimated strain value estimated and the actual strain value, and determining, by the tangible processing unit, based on the difference determined, whether an overheating condition exists for the active material.

In still another aspect, the present disclosure relates to a computer-readable storage device comprising computer-executable instructions that, when executed by a processor, cause the processor to perform operations, for use in protecting an active-material actuator from overheating without using a temperature sensor. The operations comprise receiving a signal from an electrical meter indicating, directly or indirectly, an electrical resistance of an active material connected to the meter. The active material is (a) transformable between a first state and a second state in response to a pre-determined stimulus and (b) pre-tensioned to at least a pre-determined threshold, yielding the pre-tensioned active material. The operations further comprise estimating based on the electrical resistance, an strain value for the active material, yielding an estimated strain value, obtaining an actual strain value for the active material, determining a difference between the estimated strain value estimated and the actual strain value, and determining, based on the difference determined, whether an overheating condition exists for the active material.

Other aspects of the present technology will be in part apparent and in part pointed out hereinafter.

BRIEF DESCRIPTION OF THE DRAWINGS

FIG. 2 illustrates an exemplary computing system for use in performing some or all of the processing-related functions described herein.

FIG. 4 illustrates a third graph, showing strain versus time and an overheat zone, also, as well as a pre-determined temperature threshold, for describing aspects of the present technology.

FIG. 5 illustrates schematically a method including functions of the present technology.

Figure 1:
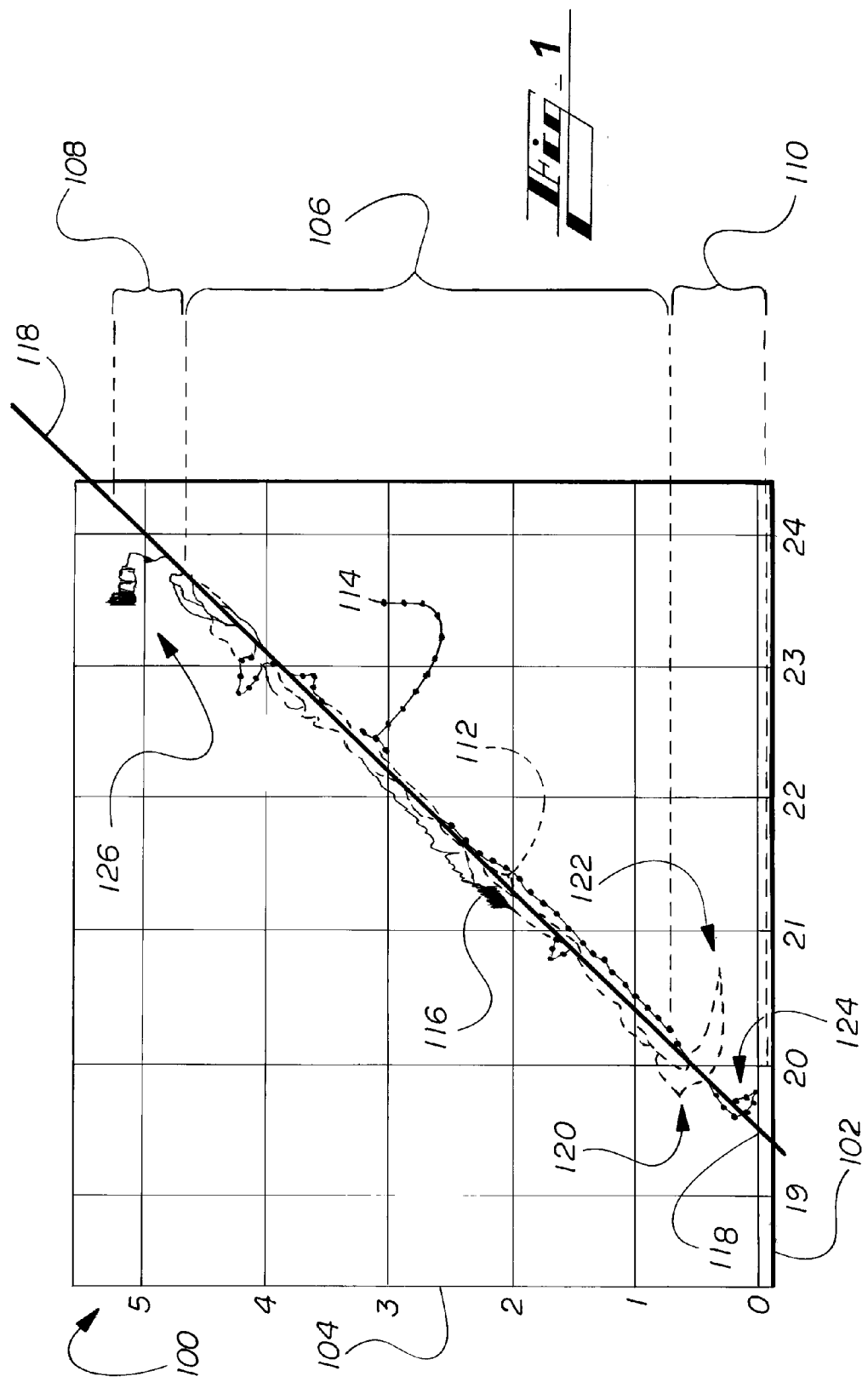
FIG. 1 illustrates a first graph having an x-axis associated with electrical resistance, a y-axis associated with strain, three sets of example data from operation of an actuator according to the present technology, regions of linear and non-linear performance, and a linear representation of the data.

It will be appreciated that for simplicity and clarity of illustration, elements shown in the figures have not necessarily been drawn to scale. Dimensions of some of the elements may, for example, be exaggerated relative to other elements for clarity. Further, where considered appropriate, reference numerals may be repeated among the figures to indicate corresponding or analogous elements.

DETAILED DESCRIPTION

As required, detailed embodiments of the present disclosure are disclosed herein. The disclosed embodiments are merely examples that may be embodied in various and alternative forms, and combinations thereof. As used herein, for example, "exemplary," and similar terms, refer expansively to embodiments that serve as an illustration, specimen, model or pattern.

Descriptions are to be considered broadly, within the spirit of the description. For example, references to connections between any two parts herein are intended to encompass the two parts being connected directly or indirectly to each other. As another example, a single component described herein, such as in connection with one or more functions, is to be interpreted to cover embodiments in which more than one component is used instead to perform the function(s). And vice versa—i.e., multiple components described herein in connection with one or more functions is to be interpreted to cover embodiments in which a single component performs the function(s).

The figures are not necessarily to scale and some features may be exaggerated or minimized, such as to show details of particular components.

In some instances, well-known components, systems, materials or methods have not been described in detail in order to avoid obscuring the present disclosure. Specific structural and functional details disclosed herein are therefore not to be interpreted as limiting, but merely as a basis for the claims and as a representative basis for teaching one skilled in the art to employ the present disclosure.

I. Overview of the Disclosure

In various embodiments, systems, algorithms, and methods for detecting overheat conditions for an active materials, such as shape-memory alloys (SMAs), used in an actuator, or actuation device, and doing so without using a temperature sensor.

More particularly, the process involves determining whether overheat conditions exist, for an active material, using material resistance and measurements of position and strain for the material, again, without using a temperature sensor.

Under basic conditions, without sufficient pre-tension applied to the active material, though, the relationship between material strain and electrical resistance is too volatile. More particularly the relationship is generally non-linear under these circumstances, no matter the condition (e.g., no matter the input temperature). Active materials also exhibit hysteresis effects and are stress dependent under these circumstances.

It has been further determined, however, that the aforesaid challenges—non-linearity, hysteresis, and stress dependency, are substantially obviated when the active material is pre-tensioned sufficiently. The level of sufficient tension can be referred to as a tension threshold, pre-tension threshold, threshold tension, threshold pre-tension, similar, or other. The pre-tensioning reduces volatility of the system, such as the stress dependence that the system would otherwise have.

Even with the pre-tensioning above the determined tension threshold level, the strain-electrical resistance relationship is still non-linear outside of a first region. The first region corresponds to active-material temperatures above a second, Martensite-phase temperature, region of the material and below a third, Austenite-phase temperature, region for the material. These three (3) regions are described further below, including in connection with FIG. 1 illustrating them.

The pre-tension is applied using the structures to which the active material is connected. One of the structures, e.g., a connecting anchor point is adjusted to pull the material tauter, or tighter, until the active material is tensioned to at least the tension threshold. The adjustment is in some embodiments, made prior to system operation, such as in a manufacturing or pre-manufacturing phase, such as by a person or machine assembling at least the actuator system of the subject apparatus (e.g., vehicle). In some embodiments, the adjustment is made by the system, such as online, during system operation. The system can include, e.g., a biasing spring or other device configured and arranged in the system to pull the active material to at least the desired, tension threshold, tension level prior to system operation.

In one, exemplary, implementation including an SMA wire, the tension threshold is about 100 MPa (megapascals). For this implementation, it has been found that relevant system characteristics, including the strain-electrical resistance relationship, are improved when at least 100 MPa of tension is applied to the wire prior to operation.

As provided, the electrical resistance-strain relationship for the wire, the relationship is, when pre-tension above this tension threshold is pre-applied, linear, or generally or nearly linear in connection with the first region mentioned above. In any event, the relationship is significantly more linear, in this region, and the other two regions (supra-Austenite-phase temperature region and sub-Martensite-phase temperature region), than if the wire was not pre-tensioned or was pre-tensioned below the tension threshold.

Regarding the other system characteristics, hysteresis is abated to an acceptably low level, as is stress dependency. In some cases, the level for one or both of these characteristics can be reduced to nil, or nearly zero—e.g., no or almost no stress dependency and/or no or almost no hysteresis.

It has been found that there is a generally linear relation between strain ($\epsilon$) and resistance (R) in active materials (e.g., SMA wires) that are pre-tensioned above a certain values. In one embodiment, the threshold tension is about 100 megapascals (MPa). In some embodiments of the present technology, characteristics of the active material associated with the second and third, still, despite the pre-tensioning, somewhat non-linear, regions, mentioned above, are used to detect when an overheating condition exists, as described further below.

In other words, while pre-tensioning the active material eliminates much of the volatility (e.g., hysteresis, stress-dependence, etc.) and non-linearity associated with active-material behavior, rendering the characteristics substantially linear and less-volatile in a first temperature range (e.g., between the Austenite-finish and Martensite-finish phase temperatures), characteristics remain at least somewhat non-linear outside of the first region—i.e., in the second and third regions, and embodiments of the present technology determine whether an overheat condition exists in the active material based on characteristics of the material in one or both of these non-linear regions (e.g., second and third regions).

As also described in more detail below, the present process includes a system estimating a strain in the active material based on a measured electrical resistance in the material. The system also obtains an actual strain for the active material, such as by receiving the strain value, or data indicating the actual strain value, from a sensor associated with the active material. The sensor can include a strain sensor, such as a strain gauge, or a displacement- or position-related sensor such as a linear variable differential transformer (LVDT) sensor.

Then, the system compares the estimated strain to the actual, measured, strain. A deviation, or mismatch, of a certain magnitude, between the estimated and measured strain values is indicative of an overheat condition. The strain threshold can have any of a variety of forms. In one embodiment, the strain threshold is a percentage, and comparing the actual and measured strains includes determining a percentage difference between them and comparing the difference to the percentage strain threshold. In one embodiment, the strain threshold is a strain value, and comparing the actual and measured strains includes determining a difference between the two and comparing the difference to the strain-value threshold.

Depending on the implementation, the mismatch, or deviation, can indicate an actual present overheat condition, and imminent overheat condition, a likely overheat condition, or a likely imminent overheat condition.

The active material is, in some embodiments, a wire, or a braided structure. Whatever the active-material form, the system is configured to determine whether an overheat condition exists using only the measurements of actual resistance and strain for the active material.

Though not relevant to all embodiments of the present technology, it is noted that the linear resistance-strain relationship, in active-materials pre-tensioned to above the threshold, can be modeled with a relatively small amount of reference data as compared to systems not pre-tensioned or pre-tensioned below the threshold. As mentioned, for insufficiently tensioned systems, substantial pre-calibration is required, such as by an arduous process of modeling a plethora conditions through a very large training set. In sufficiently tensioned systems, though, only slight reference data indicating the line of the linear relationship is needed. The reference data, or calibration data, can include simply two (2) resistance/strain pairs: $X_1$, $R_1$ and $X_2$, $R_2$, wherein $X_1$ represents a first strain, $R_1$ represents a first resistance corresponding to the first strain, $X_1$ represents a second strain, and $R_2$ represents a corresponding second resistance $X_2$. The reference data can be determined offline, such as in a manufacturing o pre-manufacturing process, or online, such as during seller (e.g., dealership) or customer operation of the apparatus, such as an automobile, in which the actuator is used.

II. Non-linear Characteristics and Supporting Conditions— FIG. 1

Now turning to the figures, and more particularly to the first figure, FIG. 1 illustrates a graph 100 illustrating strain values against electrical resistance values corresponding to an active material, of an actuator, for which at least a threshold pre-tension is applied. As mentioned above, in one embodiment the threshold is about 100 MPa.

The x-axis 102 represents electrical resistance measured in the active material—e.g., SMA wire. In the illustrated embodiment, the resistance is measured in Ohms. The y-axis 104 represents strain of the active material. In the illustrated embodiment, the strain is represented by percentages. The graph 100 thus shows percentages of strain change from 0% in connection with corresponding electrical resistance of the active material.

With further reference to the graph 100, a linear region of operation for the actuator, and more particularly the active material (e.g., SMA wire), is referenced in FIG. 1 by numeral 106. In this region 106, or zone, area, etc., the active material behaves in the generally a linear, non-hysteretic, and stress-independent manner. The region 106 corresponds to a certain range of inputs. For embodiments in which the active material is actuated by heat, the region 106 corresponds to a range of actuating temperatures.

Continuing with the heat-actuated example, the primary operating region 106 corresponds to application of heat between a low-temperature range 108, below a Martensite-finish phase of the active material, and a high-temperature range 110, above an Austenite-finish phase of the active material.

With continued reference to FIG. 1, data lines 112, 114, 116 of the graph 100 represent strain-resistance results for three tests performed on an SMA-wire active material pre-tensioned to above a threshold of 100 MPa. As shown, the data lines 112, 114, 116 are substantially linear within the middle region 106. Te SMA also exhibits low hysteresis and low stress dependency in the region 106. More particularly, the data lines correspond generally to a representative strain-resistance line 118 in the region 106.

The strain-resistance relationship of the SMA wire is sometimes, often, or always generally non-linear outside of the first region 106, as can be seen in the graph 100. I.e., the relationship becomes non-linear when the actuating temperature is above the Austenite-finish-phase temperature or below the Martensite-finish phase temperature. The non-linearity in at least some embodiments occurs because, outside of the working region 106, strain changes little or none with input-temperature change while electrical resistance changes notably with input-temperature change.

The graph 100 shows, for instance, a first of the data lines 112 departing from the general linear representation 118 of the data in the supra-Austenite-finish region 110 at two locations 120, 122.

As another example of the strain-resistance relationship of the SMA wire being non-linear at times outside of the working region 106, the graph 100 shows a second of the data lines 114 departing from the general linear representation 118 of the data in the sub-Martensite-finish region 108 in a location 124.

As still another example of the strain-resistance relationship of the SMA wire being non-linear at times outside of the working region 106, the graph 100 shows a third of the data lines 116 departing from the general linear representation 118 of the data in the sub-Martensite-finish region 108 in a location 126.

A relationship between strain and electrical resistance can be represented by the following equation:

$$\epsilon_{pre} = aR + b \qquad \text{(Equation 1)};$$

wherein:
$\epsilon_{pre}$ represents a predicted wire strain;
R represents a resistance of the active material (e.g., SMA wire); and
a and b are constants.

The line 118 can define the line, or linear regression of the predicted strain-electrical resistance relationship.

As mentioned above, the resulting strains, which can be measured in percentage, such as shown in FIG. 1, or a decimal analog, correspond to an amount that the wire has been elongated or shortened.

More particularly, the data lines correspond generally, in the first region 106, to a representative strain-resistance line 118, which is also shown in the figure. In some implementations, with the input (e.g., temperature) corresponding the first region 106, and with the SMA wire pre-tensioned to at least the applicable threshold (e.g., 100 MPa), a deviation of less than about 0.1% was been found between wire strain values predicted, based on measured wire resistance, and actual (e.g., measured) strain values for the wire.

Outside of the working region 106 (i.e., in the supra-Austenite-finish region 110 or in the sub-Martensite-finish region 108), the deviation, between wire strain values predicted, based on measured wire resistance, and actual (e.g., measured) strain values for the wire, is still not significant, but generally higher, usually being below about 1%, and so magnitudes higher.

Thus, for a wide range of strains, in a region 106 corresponding to temperature of the active material, the strain-electrical resistance relationship remains generally linear, and is not dependent on many variables that could otherwise affect the relationship, including temperature. And thus, for sufficiently pre-strained active materials, only for temperatures above or below certain limits, such as the Austenite-finish and Martensite-finish phase temperatures mentioned, does the resistance-strain relationship for the material become non-linear.

As mentioned, in the non-linear regions 108, 110, the resistance changes with temperature while the strain remains constant or nearly constant, causing the non-linearity.

As referenced above, and described in further detail below, a deviation between an actual, measured, strain, and the estimated, or predicted, strain is an indication of overheating. As also mentioned, depending on a deviation threshold, or trigger, deviation can indicate an actual present overheat condition, and imminent overheat condition, a likely overheat condition, or a likely imminent overheat condition.

As further mentioned above, and described in further detail below, the systems and methods of the present technology use data corresponding to non-linear regions—e.g., the second and third regions 108, 110 of FIG. 1—in detecting overheat conditions.

III. Processing Structure—FIG. 2

Apparatus according to the technology includes at least one processing unit configured to perform functions described herein, such as determining a deviation between active material (e.g., SMA wire) strain predicted, based on material electrical resistance, and actual strain.

In some embodiments, the processing unit includes one or more relatively-simple devices. In some embodiments, the unit includes a programmable controller. In some embodiments the unit includes a computer system.

FIG. 2 illustrates an example computer system 202 for use in performing the operations of the present technology. The system 202 is shown in the context of an apparatus 200. The apparatus 200 could be, for instance, an automobile, a manufacturing machine, etc.

The system 202 includes a memory, or computer-readable medium 204, such as volatile medium, non-volatile medium, removable medium, and non-removable medium.

The term computer-readable media and variants thereof, as used in the specification and claims, refer to tangible storage media. The media can be a device, and can be non-transitory.

In some embodiments, the storage media includes volatile and/or non-volatile, removable, and/or non-removable media, such as, for example, random access memory (RAM), read-only memory (ROM), electrically erasable programmable read-only memory (EEPROM), solid state memory or other memory technology, CD ROM, DVD, BLU-RAY, or other optical disk storage, magnetic tape, magnetic disk storage or other magnetic storage devices.

The computing system 202 also includes a computer processor 206 connected or connectable to the computer-readable medium 204 by way of a communication link 208, such as a computer bus.

The computer-readable medium 204 includes computer-executable instructions 210. The computer-executable instructions 210 are executable by the computer processor 206 to cause the processor, and thus the computing system 202, to perform all or any combination of the functions described in the present disclosure.

The computer-executable instructions 210 can be arranged in one or more software modules, or engines, or the like. The modules can be referred to by the operations or operations that they cause the computer processor 206 to perform.

For instance, a module including instructions that, when executed by the processor 206, cause the processor to perform an operation of determining an electrical resistance can be referred to as resistance-determining module, an electrical-resistance-determination engine, or the like.

Similarly, a module causing the computer processor to perform an operation of estimating a strain of the active material (e.g., an SMA wire) can be referred to as a strain-estimation module, a strain-estimating engine, or the like.

The term software module, or variants thereof, is used expansively herein to include routines, program modules, programs, components, data structures, algorithms, and the like. Software modules can be implemented on various system configurations, including servers, network systems, single-processor or multiprocessor systems, minicomputers, mainframe computers, personal computers, hand-held computing devices, mobile devices, microprocessor-based, programmable consumer electronics, combinations thereof, and the like.

The computer processor 206 is also connected or connectable to at least one interface 212 for facilitating communications, between the computing system 202 and local components 214, and between the computing system 202 and remote components 216.

For communicating with the local components 214, the interface 212 can include one or both of wired connections and wireless components—e.g., transceiver, transmitter, and/or receiver.

Example local components include an instrument for measuring electrical resistance, or related characteristics (e.g., voltage and current) of the active material (e.g., SMA wire), such as an ohmmeter or a multimeter.

Multimeters measure multiple electrical properties, typically including electrical resistance and voltage. Some such meters, measuring at least electrical resistance (R) and voltage (V) are referred to as volt-ohm meters, or VOMs, and many of these can also measure current (I).

In some cases, the device measures two of these three characteristics and determines the third of these using Ohm's law: $V = I \cdot R$, or provides the two measurements to a processor, such as the processor 206 of FIG. 2, which in turns calculates the third value. In one embodiment, for instance, current (I) and voltage (V) passing through the active material (e.g., SMA wire) are measured, and the corresponding resistance (R) calculated therefrom.

Another example local component 214 or instrument is an active-material position sensor, such as a linear variable differential transformer (LVDT) sensor.

Local components 214 could also include local instrumentation that may be connected at least intermittently at times to the vehicle, e.g., into the interface 812 directly.

For communicating with the remote components 216, the interface 212 includes one or both of a short-range transceiver (or transmitter and/or receiver) and a long-range transceiver (or transmitter and/or receiver).

The remote components 216 can include databases, servers, other processors, other storage mediums, and/or other computing devices. Software updates for the computer-executable code 210 can be received, for instance, from a customer-service system such as the OnStar® system.

Although shown as being a part of the computer system 202, completely, the interface 212, or any aspect(s) thereof, can be partially or completely a part of the system 202. The interface 212, or any aspect(s) thereof, can be partially or completely external to and connected or connectable to the computing system 202.

IV. Estimated Versus Actual Strain Deviation—FIG. 3

Figure 3:
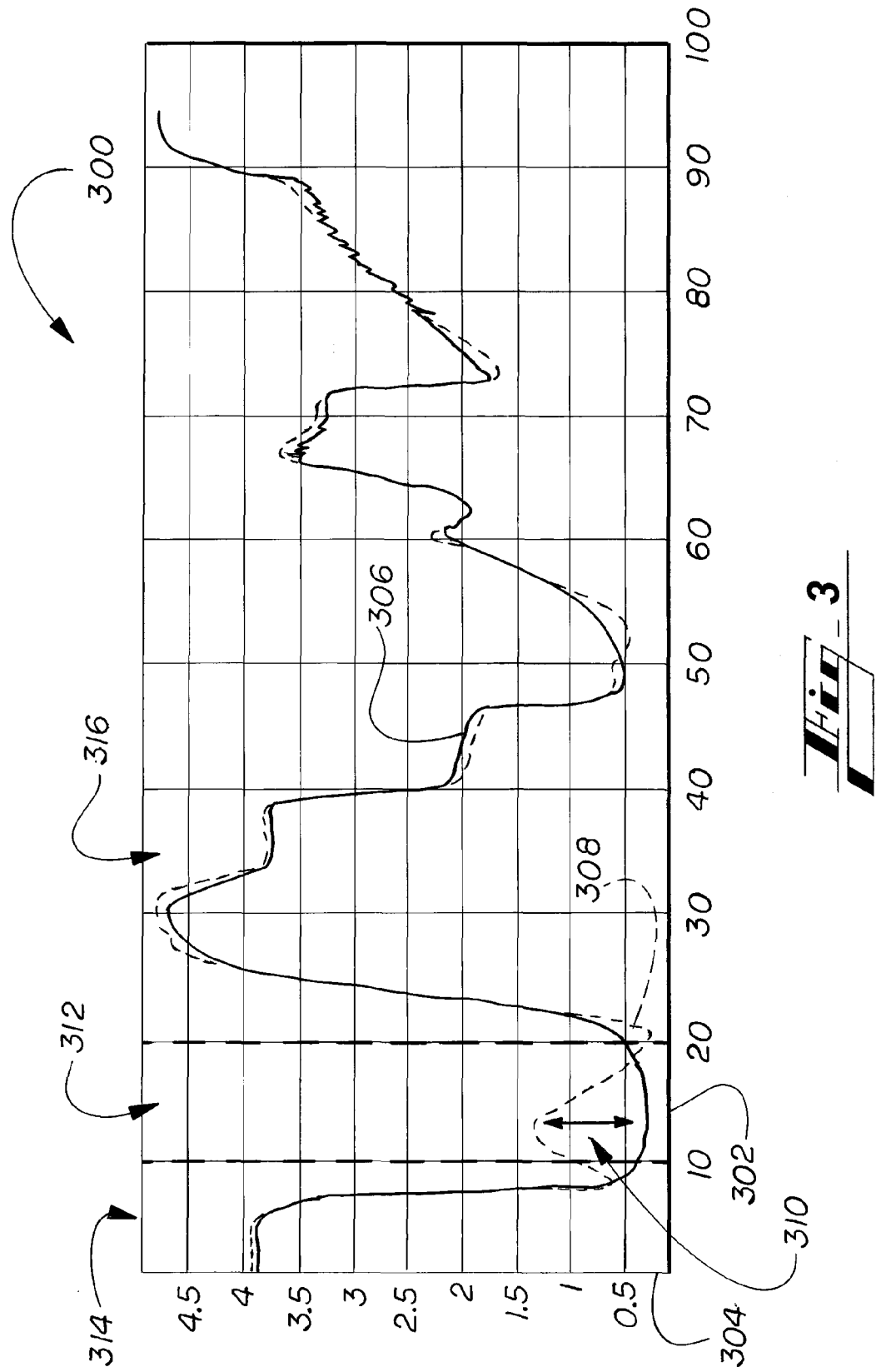
FIG. 3 illustrates a second graph showing strain versus time, and an overheat zone, for describing aspects of the present technology.

FIG. 3 illustrates a second graph 300 showing both estimated, or predicted, strain versus time.

The graph 300 includes an x-axis 302 representing passage of time. The time can be represented in any time unit, such as milliseconds or seconds. The y-axis 304 represents levels of strain for the active material—e.g., SMA wire. The strain can be represented by Ohms, for instance.

A first data line 306 indicates actual, measured, values of strain measured from the active material. As provided, the actual strain can be determined in any of a variety of ways, without departing from the scope of the present technology. The ways can include, e.g., the system obtaining an actual strain for the active material, such as by receiving a strain value, directly, or data indicating the actual strain, such as from a sensor associated with the active material. The sensor can include, for instance, a strain sensor, such as a strain gauge, or a displacement- or position-related sensor such as a linear variable differential transformer (LVDT) sensor.

A second data line 308 indicates predicted, or estimated, strain values. As provided, estimating a strain in the active material is in at least some embodiments performed based on a measured electrical resistance of the active material. As also mentioned, above, the resistance, or data indicating resistance (e.g., an applicable voltage (V) and current (I)), can be received from an instrument for measuring electrical resistance or related characteristics (e.g., current and voltage) of the active material (e.g., SMA wire), such as an ohmmeter or a multimeter. Multimeters measure multiple electrical properties, typically including electrical resistance and voltage. Some such meters, measuring at least electrical resistance (R) and voltage (V) are referred to as volt-ohm meters, or VOMs, and many of these can also measure current (I). In some cases, the device measures two of these three characteristics and determines the third of these using Ohm's law: V=I·R, or provides the two measurements to a processor, such as the processor 206 of FIG. 2, which in turns calculates the third value. In one embodiment, for instance, current (I) and voltage (V) passing through the active material (e.g., SMA wire) are measured, and the corresponding resistance (R) calculated therefrom.

With continued reference to FIG. 3, it can be seen that for most of the time period illustrated, the estimated, or predicted, strain value 308 generally matches the actual, or measured strain value 306. A deviation, or difference, between the two is called out by reference numeral 310.

As shown in the graph 300, the deviation 310 is relatively large in a first portion 312 of the graph 300. The first portion 312 spans generally 10 to 20 time units (e.g., seconds). For most of the remaining time, corresponding to the other, second and third, portions 314, 316, the deviation is nil, negligible, or nearly zero.

The deviation 310 indicates an overheating condition when above a predetermined threshold. The deviation threshold can be pre-set, such as in pre-manufacturing calibrations of the system. The threshold is in some implementations pre-set specific to a particular apparatus (e.g., actuator). In some implementations, the threshold is pre-set once for all apparatus of a certain type—e.g., for each of a certain type of actuator.

The threshold is, in one embodiment, represented by a percentage. The threshold could stipulate, for instance, that the deviation 310 is greater than desired if the estimated strain 308 varies by more than 0.5% from the actual strain 306. A designer of the system can pre-set the threshold at other percentages—e.g., 0.25%, 0.75%, 1%, 2%, 2.5%, 5%, 10%, higher values, lower values or values therebetween, without departing from the scope of the present technology.

The threshold is, in one embodiment, represented by a pre-set strain measurement, such as in Ohms. The threshold could stipulate, for instance, that the deviation 310 is greater than desired if the estimated strain 308 varies by more than 0.2 Ohms from the actual strain 306. A designer of the system can pre-set the threshold at other percentages—e.g., 0.1 Ohms, 0.25 Ohms, 0.3 Ohms, 0.5 Ohms, higher values, lower values or values therebetween, without departing from the scope of the present technology.

In the Example of FIG. 3, the deviation threshold is set such that the deviation 310 exceeds the threshold generally during the first time span 312. This portion 312 thus indicates an overheat condition—i.e., the active material is being overheated.

Again, as provided, setting of the deviation threshold can control what in particular the alert, or flag, triggered by the threshold being reached means for the system. For instance, the deviation threshold can be set so that the threshold being reached indicates that an actual present overheat condition already exists.

Or the deviation threshold can be set so that the threshold being reached indicates that an overheat condition is imminent, such as to occur if the temperature is raised further (e.g., by a certain amount) and/or is kept at the present temperature much longer (e.g., for a certain amount of time). Etc.

Thus, the deviation threshold can be set conservatively, for example, so that an alert is identified well in advance of circumstances under which the active material will be damaged. Or, for systems in which temperatures are known to often approach but not reach damaging levels, the deviation threshold can be set more aggressively, so that an alert is only identified when damage is very imminent.

The system is further configured to, in response to the deviation-threshold-reached, or deviation-threshold-exceeded, alert, take damage-preventing actions or precautions.

The particular response to the alert can also be preset depending on the threshold. The system can be configured so that a conservative threshold is set and, for example, action following an alert includes reducing temperature input and/or continuing to monitor the active material. Or the system can be set with a more aggressive threshold and the resulting action can include immediately removing the heat stimulus being provided. As referenced, the action could include applying a counter stimulus, such as relative cold.

In a contemplated embodiment, multiple thresholds are pre-set corresponding to different thresholds. The system could thus be pre-programmed with corresponding responses—e.g., reduce temperature in response to a lower, conservative, threshold being breached, and remove heat or current stimulus immediately in response to a second, more aggressive, threshold being breached.

In some embodiments, the threshold can be set, such as in pre-manufacturing trials or calibrations, to correspond to a certain active-material temperature. The data in FIGS. 3 and 4 can show results of such testing, for instance.

As described further below in connection with FIG. 4, the strain-deviation threshold can be set to correspond with a pre-identified temperature threshold. The pre-testing can relate active-material temperatures with corresponding strain deviations, and match undesired strain deviations to corresponding temperatures that the active material is at when the deviations exist. Thus, a threshold deviation can be set corresponding to a threshold temperature, above which the active material should not go.

The process is described further below in connection with FIGS. 4 and 5.

V. Active-material Temperatures Over Time—FIG. 4

FIG. 4 illustrates a third graph 400, also showing strain versus time. The x-axis 402 of FIG. 4 represents passage of time, matching the timeline of the graph 300 of FIG. 3. The y-axis 404 of FIG. 4 represents temperature, in degrees Celsius. The data line 406 shows how temperature of the active material changes with time.

The graph 400 also shows a threshold temperature 408 being a temperature above which the active material should not be taken, or a warning temperature proximate to but short of active material damage. In the example of FIG. 4, the threshold temperature is about 140° C.

As shown, the active-material temperature 406 exceeds the threshold temperature of 140° C. between a time span 412 of about 10 and 20 time units (e.g., seconds). The time span 412 correlates to the overheat zone shown in and described above in connection with the graph 300 of FIG. 3.

As provided, the system is configured to, in response to a deviation-threshold-reached alert, or a deviation-threshold-exceeded alert, take damage-preventing actions or precautions. And the particular response to the alert can be preset and depend on the deviation threshold set; and, as described, the deviation threshold corresponds to a temperature threshold identified. The system can be configured so that a conservative threshold is set and, for example, action following an alert includes reducing temperature input and/or continuing to monitor the active material. Or the system can be set with a more aggressive threshold and the resulting action can include immediately removing the heat stimulus being provided. As referenced, the action could include applying a counter stimulus, such as relative cold.

The process is described further below in connection with FIG. 5.

VI. Method of Operation—FIG. 5

FIG. 5 shows an exemplary method 500 for monitoring heating conditions of an active material (e.g., SMA wire) and determining whether an overheat condition exists, according to embodiments of the present technology.

It should be understood that the steps of the method 500 are not necessarily presented in any particular order and that performance of some or all the steps in an alternative order is possible and is contemplated.

The steps have been presented in the demonstrated order for ease of description and illustration. Steps can be added, omitted and/or performed simultaneously without departing from the scope of the appended claims. It should also be understood that the illustrated method 500 can be ended at any time.

In certain embodiments, some or all steps of this process, and/or substantially equivalent steps are performed by a processor, e.g., computer processor, executing computer-executable instructions stored or included on a computer-readable medium, such as the memory 204 of the system 202 described above.

The algorithm, or method, 500 begins 501 and flow proceeds to block 502, whereat constants, a and b, are determined in connection with the subject active material (e.g., SMA wire). The constants are part of the first equation (Equation 1), provided above:

$$\epsilon_{pre} = aR + b$$

wherein:
$\epsilon_{pre}$ represents a predicted wire strain;
R represents an active-material resistance; &
a and b are constants.

The determinations can be made in pre-manufacturing trials, tests, or calibration.

The constants are selected so that, under a variety of linear conditions (e.g., pre-tensioned active material, and temperatures safely below overheat conditions), the strain ($\epsilon_{pre}$) estimated by the first equation, based on the resistance (R), is generally equal to an actual, or measured, strain (or, $\epsilon_{meas}$, or $\epsilon_{actual}$, etc.) of the active material during the same time period.

The determination 502 can include performance of a sub-routine such as a least-squared quadratic (LSQ) method.

At operation 504, the system determines a present predicted, or estimated, strain ($\epsilon_{est}$, or $\epsilon_{pre}$) level of the active material. As described above, estimating the strain can be performed based on an active-material resistance measured.

As described, active-material resistance, or data indicating resistance (e.g., an applicable voltage (V) and current (I)), can be received from an instrument for measuring electrical resistance or related characteristics (e.g., current and voltage) of the active material (e.g., SMA wire), such as an ohmmeter or a multimeter. The instrument is in some embodiments a part of what is considered the performing system and in some embodiments in operative communication with the performing system, such as by wired or at-least selective wireless connection.

As further explained above, multimeters measure multiple electrical properties, typically including electrical resistance and voltage. Some such meters, measuring at least electrical resistance (R) and voltage (V) are referred to as volt-ohm meters, or VOMs, and many of these can also measure current (I). And in some cases, the device measures two of these three characteristics and determines the third of these using Ohm's law: V=I·R, or provides the two measurements to a processor, such as the processor 206 of FIG. 2, which in turns calculates the third value (e.g., resistance (R)).

At operation 506, the system obtains an actual strain ($\epsilon_{meas}$) of the active material. As described above, obtaining the actual strain can include receiving data indicating strain value directly, or receiving data indicative of the actual strain. The data can be received from a sensor associated with the active material such as a strain sensor, e.g., a strain gauge, or a displacement- or position-related sensor such as a linear variable differential transformer (LVDT) sensor.

At operation 508, the system compares the estimated strain ($\epsilon_{est}$) to the actual, measured, strain ($\epsilon_{meas}$). In one embodiment, the comparing operation includes determining a percentage difference ($\epsilon_{\%-diff}$) between the estimated and actual strain values, i.e., a percentage by which one of the values varies from the other.

In one embodiment, the comparing operation includes calculates a strain-value difference ($\epsilon_{val-diff}$), or deviation, between the estimated strain and the measured strain:

$$\epsilon_{diff} = |\epsilon_{meas} - \epsilon_{est}| \quad \text{(Equation 2)}.$$

At operation 510, the system compares the deviation ($\epsilon_{diff}$) calculated at operation 508, whether a percentage difference ($\epsilon_{val-diff}$) or a strain-value difference ($\epsilon_{\%-diff}$), to a pre-determined deviation threshold.

The deviation threshold can thus, depending on the embodiment, be implemented as a strain value or a percentage.

Pre-determining the deviation threshold (or, threshold deviation) is described above. The deviation threshold may be selected, for instance, as the deviation that would correspond to at least a threshold temperature.

More particularly, the system determines whether the deviation calculated is equal to or greater than the deviation threshold. It will be appreciated that the system can be configured, including the deviation threshold selection, such that the comparison at operation 510 considers only whether the deviation calculated is greater than the deviation threshold.

In response to a negative result at operation 510, i.e., the deviation calculated has not reached (or exceeded, in some embodiments) the deviation threshold, the algorithm 500 can end, or flow of the algorithm 500 can proceed along path 512, or other path, to repeat one or more of the earlier operations.

In response to a positive result at operation 510, i.e., the deviation calculated at operation 508 has reached (or exceeded, in some embodiments) the deviation threshold, flow of the algorithm 500 proceeds to operation 514. At operation 514, the system determines that an alert condition exists and initiates performance of at least one precautionary, damage-preventing, action.

In one embodiment, the damage-preventing action includes reducing heat or current being applied to the active material. In one embodiment, the action include completely removing, or shutting off, input to the active material. In still another embodiment, the action includes applying a counter stimulus, such as relative cold. These are only examples and other precautionary measures may be taken.

As shown in the algorithm 500, from operation 514, the process can be repeated or ended 515.

VII. Benefits

Benefits of the present technology include allowing continuous monitoring of an active material (e.g., SMA wire) of an actuator for an overheat condition without need of a temperature sensor.

Detecting overheat of the active material supports protecting the actuator, such s by avoiding its rupture or permanent structural damage. Actuator life is thus improved.

By the present technology, active-material actuators can be more robust and flexible, and used in a broader family of applications, automotive, manufacturing, and otherwise.

Another potential benefit is financial cost saving, such as those that would be otherwise associated with the costs of such a temperature sensor.

Another potential benefit is savings of system weight and size (or packaging), such as that otherwise associated with systems requiring such a temperature sensor.

In some cases, the present technology may be more reliable than comparable systems, such as due to lacking the mentioned temperature sensor, and so being free of potential temperature sensor fault or failure.

Systems according to the present technology also have relatively-low computational burden, which can also be less than that of actual or hypothetical comparable systems, such as those requiring such temperature sensor.

VIII. Conclusion

Various embodiments of the present disclosure are disclosed herein. The disclosed embodiments are merely examples that may be embodied in various and alternative forms, and combinations thereof.

The law does not require and it is economically prohibitive to illustrate and teach every possible embodiment of the present technology. Hence, the above-described embodiments are merely exemplary illustrations of implementations set forth for a clear understanding of the principles of the disclosure.

Variations, modifications, and combinations may be made to the above-described embodiments without departing from the scope of the claims. All such variations, modifications, and combinations are included herein by the scope of this disclosure and the following claims.

What is claimed is:

1. A system, for use in protecting an active-material actuator from overheating without using a temperature sensor, comprising:
   an active material being:
   transformable between a first state and a second state in response to a pre-determined stimulus; and
   pre-tensioned to at least a pre-determined threshold, yielding the pre-tensioned active material; and
   a processing unit configured to perform operations comprising:
   obtaining a value for electrical resistance of the pre-tensioned active material;
   estimating, based on the electrical resistance obtained, an strain value for the active material, yielding an estimated strain value;
   obtaining an actual strain value for the active material;
   determining a difference between the estimated strain value estimated and the actual strain value; and
   determining, based on the difference determined, whether an overheating condition exists for the active material.

2. The system of claim 1, wherein the operation of determining whether the overheat condition exists includes comprise comparing the difference determined to a pre-set strain threshold.

3. The system of claim 2, wherein:
   the strain threshold is a percentage; and
   the operation of determining the difference includes determining a percentage difference between the estimated strain value and the actual strain value.

4. The system of claim 2, wherein:
   the strain threshold is a strain value; and
   the operation of determining the difference includes determining the difference in value between the estimated strain value and the actual strain value.

5. The system of claim 2, wherein the operations further comprise initiating, in response to determining that the difference determined is equal to or exceeds the pre-set strain threshold, an active-material damage-prevention action.

6. The system of claim 5, wherein the damage-prevention action includes removing or reducing an amount of a stimulus to the active material.

7. The system of claim 6, wherein the stimulus is selected from a group consisting of electrical current and heat.

8. The system of claim 2, wherein the operations further comprise repeating, in response to determining that the difference determined is not equal to and does not exceed the pre-set strain threshold in connection with a first time instance, the obtaining, estimating, obtaining, determining, and determining operations and comparing operations in connection with a second time instance to determine whether a difference between the actual and estimated strain values exceed the pre-set strain threshold in connection with a second time instance.

9. The system of claim 1, wherein:
   the estimated strain is determined according to a function, as follows:

$$\epsilon_{pre} = aR + b;$$

$\epsilon_{pre}$ represents the strain being estimated;
   R represents the resistance of the active material; and
   a and b are pre-set constants.

10. The system of claim 1, wherein obtaining the value for electrical resistance includes receiving, from an electric meter, a signal indicating the value.

11. The system of claim 1, wherein obtaining the value for electrical resistance includes receiving, from an electric meter, data indicating a voltage and a current and determining the value for resistance therefrom.

12. The system of claim 1, wherein the operations further comprise controlling the stimulus provided to the active material so that the material is kept within a pre-determined temperature range.

13. The system of claim 12, wherein the pre-determined temperature range is above an Austenite-finish-phase temperature associated with the active material and/or below a Martensite-finish-phase temperature associated with the active material.

14. The system of claim 1, wherein:
the system further comprises an electric meter, in electrical communication with the active material, for use in obtaining the value for electrical resistance; and
the processing unit comprises:
a processor; and
a computer-readable medium holding computer-executable instructions that, when executed by the processor, cause the processor to perform the operations.

15. The system of claim 1, wherein the pre-tension threshold is about 100 megapascals (MPa).

16. The system of claim 1, wherein the active material includes a shape memory alloy.

17. The system of claim 1, wherein the active material is implemented as a wire.

18. The system of claim 1, further comprising an actuator, wherein the active material is a part of the actuator.

19. A method, for use in protecting an active-material actuator from overheating without using a temperature sensor, comprising:
receiving, by a tangible processing unit, a signal from an electrical meter indicating, directly or indirectly, an electrical resistance of an active material connected to the meter, wherein the active material is:
transformable between a first state and a second state in response to a pre-determined stimulus; and
pre-tensioned to at least a pre-determined threshold, yielding the pre-tensioned active material;
estimating, by the tangible processing unit, based on the electrical resistance, an strain value for the active material, yielding an estimated strain value;
obtaining, by the tangible processing unit, an actual strain value for the active material;
determining, by the tangible processing unit a difference between the estimated strain value estimated and the actual strain value; and
determining, by the tangible processing unit, based on the difference determined, whether an overheating condition exists for the active material.

20. A non-transitory computer-readable storage device comprising computer-executable instructions that, when executed by a processor, cause the processor to perform operations, for use in protecting an active-material actuator from overheating without using a temperature sensor, comprising:
receiving a signal from an electrical meter indicating, directly or indirectly an electrical resistance of an active material connected to the meter, wherein the active material is:
transformable between a first state and a second state in response to a pre-determined stimulus; and
pre-tensioned to at least a pre-determined threshold, yielding the pre-tensioned active material;
estimating based on the electrical resistance, a strain value for the active material, yielding an estimated strain value;
obtaining an actual strain value for the active material;
determining a difference between the estimated strain value estimated and the actual strain value; and
determining, based on the difference determined, whether an overheating condition exists for the active material.

* * * * *